＃ United States Patent (12) United States Patent
Lapke et al.

(10) Patent No.: US 7,870,932 B2
(45) Date of Patent: Jan. 18, 2011

(54) RETRACTABLE ACCESS SYSTEM LADDER AND WORK MACHINE USING SAME

(75) Inventors: Robert A. Lapke, Peoria, IL (US); Kurt J. Scheidenhelm, Bloomington, IL (US); Eric J. Beaupre, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 1009 days.

(21) Appl. No.: 10/950,956

(22) Filed: Sep. 27, 2004

(65) Prior Publication Data

US 2006/0070804 A1 Apr. 6, 2006

(51) Int. Cl.
*E06C 5/00* (2006.01)
(52) U.S. Cl. .......................... 182/127; 182/86; 182/97; 182/129
(58) Field of Classification Search .................... 16/221, 16/242, 244, 354, 54, 195, 201, 71, 79; 182/86, 182/97, 127; 248/210, 309.1, 316.4, 316.5; 224/405, 324, 325, 326
See application file for complete search history.

(56) References Cited

U.S. PATENT DOCUMENTS

| | | | | | |
|---|---|---|---|---|---|
| 671,767 | A | * | 4/1901 | Kaiser | 114/192 |
| 686,944 | A | * | 11/1901 | MacLean | 105/326 |
| 2,080,527 | A | * | 5/1937 | Bixel | 248/316.5 |
| 2,237,853 | A | * | 4/1941 | Troche | 182/127 |
| 2,967,584 | A | * | 1/1961 | Westerlund | 182/97 |
| 3,047,093 | A | * | 7/1962 | Cruz | 182/97 |
| 3,190,392 | A | | 6/1965 | Ashton et al. | |
| 3,403,749 | A | * | 10/1968 | Warren | 182/88 |
| 3,508,627 | A | * | 4/1970 | McCallum et al. | 182/97 |
| 3,545,567 | A | * | 12/1970 | Dohrman | 182/97 |
| 3,656,578 | A | * | 4/1972 | Hemken | 182/20 |
| 3,941,337 | A | * | 3/1976 | Molter et al. | 244/129.6 |
| 4,014,486 | A | * | 3/1977 | Nelson et al. | 244/129.6 |
| 4,039,163 | A | * | 8/1977 | Shorey | 244/137.1 |
| 4,187,579 | A | * | 2/1980 | Gensicke | 16/354 |
| 4,406,928 | A | * | 9/1983 | MacKenzie | 379/454 |
| 4,413,801 | A | * | 11/1983 | Lancaster et al. | 248/316.4 |
| 4,441,376 | A | * | 4/1984 | Tobey | 74/89.32 |
| 4,453,684 | A | * | 6/1984 | Hanks | 244/129.5 |
| 4,669,574 | A | * | 6/1987 | Moutot | 182/88 |
| 4,813,514 | A | * | 3/1989 | Lathers | 182/97 |
| 4,971,168 | A | * | 11/1990 | Stanescu | 182/1 |
| 5,538,100 | A | | 7/1996 | Hedley | |
| 5,850,891 | A | * | 12/1998 | Olms et al. | 182/127 |

(Continued)

OTHER PUBLICATIONS

Power Step Australia Pty. Ltd; http://powerstep.com.au/navigation.html; 8 pages; Australia.
Access Innovation for Dozers; http://accessinnovations.com.au/fordozers.htm; 2 pages.

(Continued)

*Primary Examiner*—Katherine W Mitchell
*Assistant Examiner*—Colleen M Quinn
(74) *Attorney, Agent, or Firm*—Liell & McNeil (57) ABSTRACT

A work machine and work machine access ladder assembly are provided. The work machine includes a work machine body having an operator platform. A hinge mechanism is coupled to the work machine body and defines a hinge axis oriented diagonally with respect to a vertical line. The ladder may be rotated about the hinge axis between a use and a stowed position.

19 Claims, 6 Drawing Sheets

U.S. PATENT DOCUMENTS

| | | | |
|---|---|---|---|
| 5,954,721 A * | 9/1999 | Luboshitz et al. | 606/57 |
| 5,988,316 A | 11/1999 | Hedley | |
| 6,029,775 A * | 2/2000 | Hedley et al. | 182/127 |
| 6,378,654 B1 | 4/2002 | Ziaylek, Jr. et al. | |
| 6,725,502 B2 * | 4/2004 | Moll | 16/50 |
| 6,830,257 B2 * | 12/2004 | Leitner | 280/166 |
| 6,981,572 B2 * | 1/2006 | Hedley | 182/95 |
| 7,549,831 B2 * | 6/2009 | Hendley et al. | 414/462 |
| 2002/0189899 A1 | 12/2002 | Hedley et al. | |
| 2003/0173153 A1 | 9/2003 | Hedley | |

OTHER PUBLICATIONS

Self-Leveling Tread Gangway; http://www.safe-harbor.com/frame_test_bottom.htm; 2 pages.

Pivoting Gangway; http://www.safe-harbor.com/pivoting_gangway.htm; 2 pages.

* cited by examiner

RETRACTABLE ACCESS SYSTEM LADDER AND WORK MACHINE USING SAME

TECHNICAL FIELD

The present disclosure relates generally to work machines, and more particularly to a retractable ladder for a work machine.

BACKGROUND

A variety of bulldozers, front-end loaders and other relatively large work machines include a cab mounted on a work machine body. An operator sits inside the cab, from which he or she can drive and operate the machine in a well known manner. Access to the cab is typically by way of steps or a ladder on the side of the body, allowing an operator or service technician to climb to an operator platform adjacent to or surrounding the cab.

Such work machines often operate in rugged terrain such as above-ground and underground mines, construction and demolition sites and similarly extreme environments, subjecting the work machine and work machine body to constant wear and tear. For example, a bulldozer pushing a large pile of rubble may be travelling essentially through a sea of rock to clear a path across a work surface. Thus, virtually all work machine components are robust and durable to withstand the frequent scrapes, impacts and other forces encountered during operation.

Access systems such as ladders and steps are by necessity located on the exterior of the work machine. Accordingly, as a work machine operates, the external ladders, steps, etc. can be damaged by rock, trees and other materials through which the work machine passes. A relatively flimsy ladder extending to the side of a work machine can be shorn off quite readily by passing work material. Similarly, steps on the side of the work machine can be dented, scraped, smoothed or otherwise rendered unsuitable for easy access or egress to the work machine cab by an operator.

The above concerns have prompted designers to propose various means for accessing the cab via a retractable or otherwise displaceable ladder system. When the operator needs to climb to or from the cab, a ladder can be deployed as needed. When the machine is operating, the ladder can supposedly be stowed out of the way. One access ladder design is known from U.S. Pat. No. 5,988,316 to Hedley. Hedley '316 includes a powered ladder system pivotably connected to a rotary axle. Hedley '316 proposes moving the ladder between a use position and a storage position by initially rotating the ladder in a first direction, pivoting the same upwardly, then rotating the ladder in a second direction and eventually stowing the same. Hedley '316 thus uses a relatively complex process, requiring a plurality of steps and rotational axes to stow or deploy the ladder.

The present disclosure is directed to one or more of the problems or shortcomings set forth above.

SUMMARY OF THE INVENTION

In one aspect, the present disclosure provides a work machine that includes a work machine body having an operator platform. A hinge mechanism is coupled to the work machine body and defines a hinge axis oriented diagonally with respect to a vertical line. A platform access ladder is coupled to the hinge mechanism and is movable between a use position and a stowed position about a path restricted by the hinge axis.

In another aspect, the present disclosure provides a work machine access ladder assembly that includes a ladder having first and second side rails and a plurality of steps connected between the same. The assembly further includes a hinge mechanism having a first hinge portion mounted to the first side rail, and a second hinge portion pivotably coupled to the first hinge portion. The second hinge portion includes mounting features for mounting the same to a work machine, and the hinge mechanism defines a hinge axis oriented diagonally with respect to the rails.

In still another aspect, the present disclosure provides a method of deploying or stowing an access ladder coupled to a work machine. The method includes the steps of rotating the access ladder about a fixed hinge axis through an angle of at least about 90° between a use position and a stowed position. The hinge axis is oriented diagonally with respect to the ladder.

DETAILED DESCRIPTION

Figure 1:
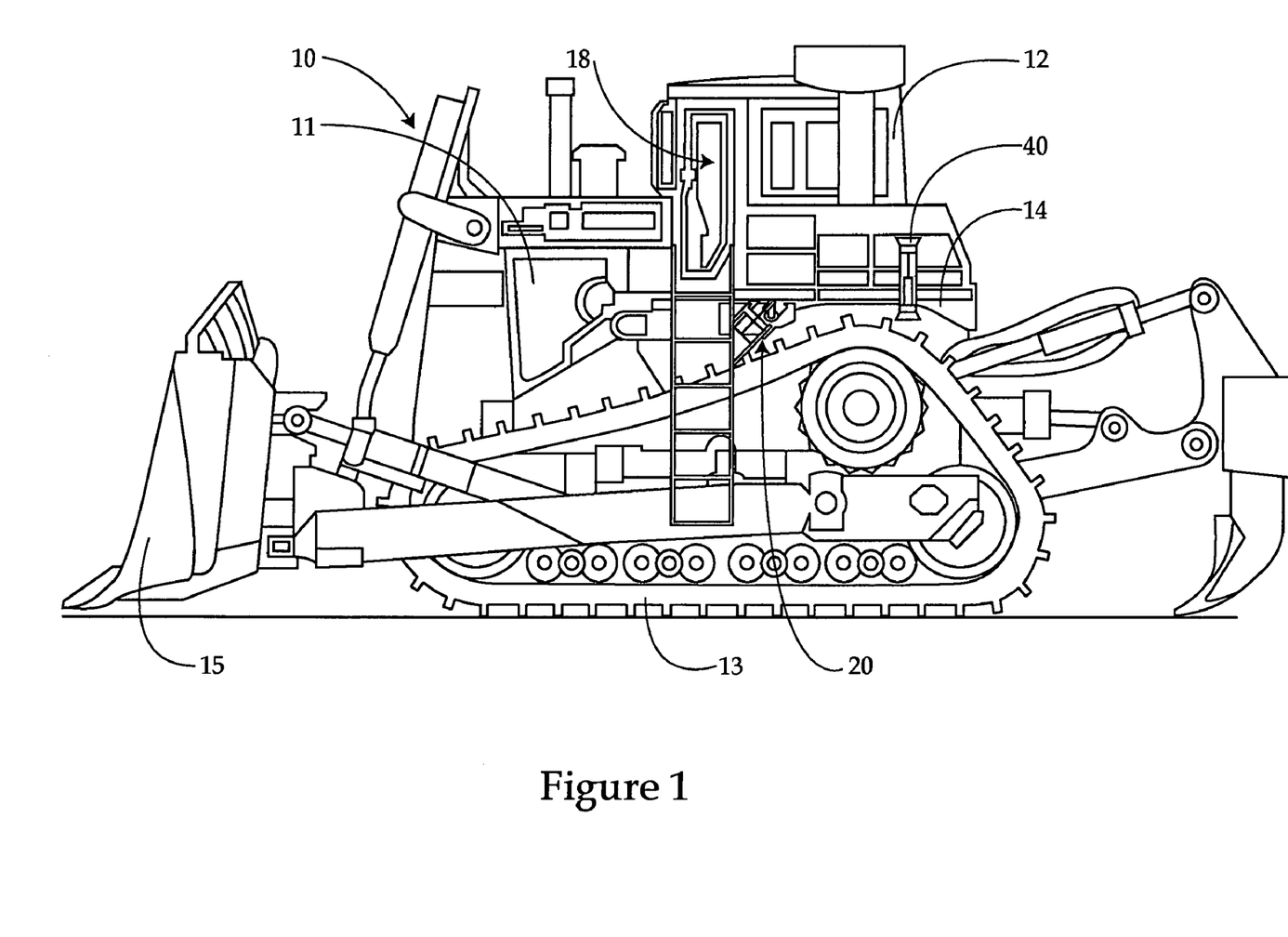
FIG. 1 is a side diagrammatic view of a work machine according to a preferred embodiment of the present disclosure.

Referring to FIG. 1, there is shown a side view of a work machine 10 according to a preferred embodiment of the present disclosure. Work machine 10 includes a work machine body 11 having a cab 12 and operator platform 14. Work machine 10 is preferably a mobile work machine such as a conventional bulldozer, including a track 13 and an implement 15 (e.g. blade). An access ladder assembly 18 is provided, allowing an operator to access cab 12, for example via operator platform 14. Ladder assembly 18 includes a hinge mechanism 20, preferably a powered hinge mechanism, for actuation between the illustrated deployed position and a stowed position, which is preferably horizontal. Those skilled in the art will appreciate that the term "operator platform" is intended to encompass a broad range of designs. As described herein, the term should be understood to include a system wherein a true platform extends around cab 12 and an operator stands or moves about thereon after utilizing ladder assembly 18, as well as a system in which ladder assembly 16 allows an operator to climb directly into cab 12. Thus, the floor of the cab could be considered part of the operator platform.

Figure 2:
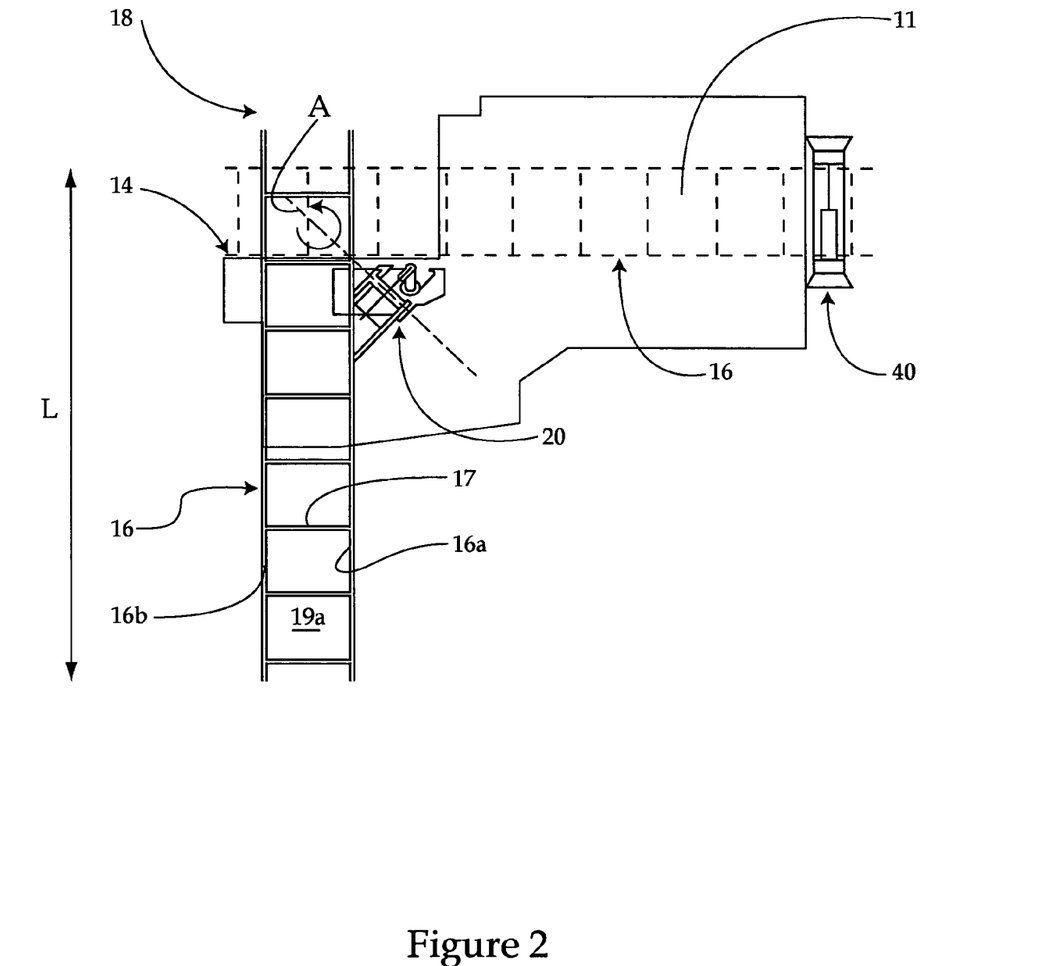
FIG. 2 is a partial diagrammatic view of the work machine access ladder assembly for the work machine of FIG. 1.

Turning to FIG. 2, there is shown access ladder assembly 18 in greater detail, in a deployed position at which an operator can utilize assembly 18 to access operator platform 14. Assembly 18 preferably includes a ladder 16 having elongate first and second rails 16a and 16b, respectively, having a plurality of steps 17 extending therebetween. Ladder 16 is coupled to work machine body 11 with hinge mechanism 20, defining a hinge axis "A". In a preferred embodiment, hinge axis A is oriented diagonally relative to a vertical line "1", and also diagonally oriented relative to rails 16a and 16b. Ladder 16 rotates on hinge mechanism 20, about hinge axis A between the illustrated deployed position and a stowed position. It should be appreciated that ladder 16 may be deployed such that the ladder rests against and is supported on the ground. Alternatively, ladder 16 might be suspended above the ground when deployed. In such an embodiment, stops or some other support might be provided against which ladder 16 rests in its deployed position, or ladder 16 might be supported solely by hinge mechanism 20.

FIG. 2 further illustrates in phantom access ladder assembly 18 in a stowed position wherein ladder 16 has been rotated on hinge mechanism 20 to a position at which it extends generally parallel to operator platform 14, though any suitable orientation out of the way would be acceptable. In moving ladder assembly 18 between the deployed and stowed positions, ladder 16 preferably rotates at least about 90°. In the illustrated example, ladder 16 is flipped front to back when rotated between the positions shown. For example, in the deployed position illustrated in FIG. 2, ladder 16 is shown having a front side 19a facing away from work machine body 11, whereas in the stored position shown in FIG. 2, ladder 16 is shown in phantom having a rear side facing away from work machine body 11. Thus, in a preferred embodiment as ladder 16 traverses its path between the deployed and stowed positions, it experiences approximately a one-half turn. The rotation angle is somewhat a matter of design choice that is related to a desired slope, if any, of the ladder in the deployed position, as well as the orientation of the same in its stowed position.

Alternative embodiments are contemplated wherein ladder 16 is rotated greater or less than a one-half turn. Similarly, ladder 16 need not extend exactly parallel to operator platform 14 in its stowed position, nor exactly parallel to vertical line "1" in its deployed position, as illustrated. In alternative embodiments the structure of work machine body 11 may be such that ladder 16 can be stowed and deployed at lesser or greater angles relative to the structures and orientations described. Further still, while a ladder has been illustrated having parallel rails 16a and 16b, with steps 17 extending perpendicularly between the same, alternative ladder configurations are possible, such as rails that narrow in the direction of the cab. Ladder assembly 18 thus provides a system wherein ladder 16 can be moved between its deployed and stowed positions in a single motion, restricted by diagonal hinge axis A. Rather than requiring plural steps to deploy or stow ladder 16, it can be swung through an arc that moves it the entire requisite distance, rather than sequentially through plural axes as in the prior art.

Figure 3:
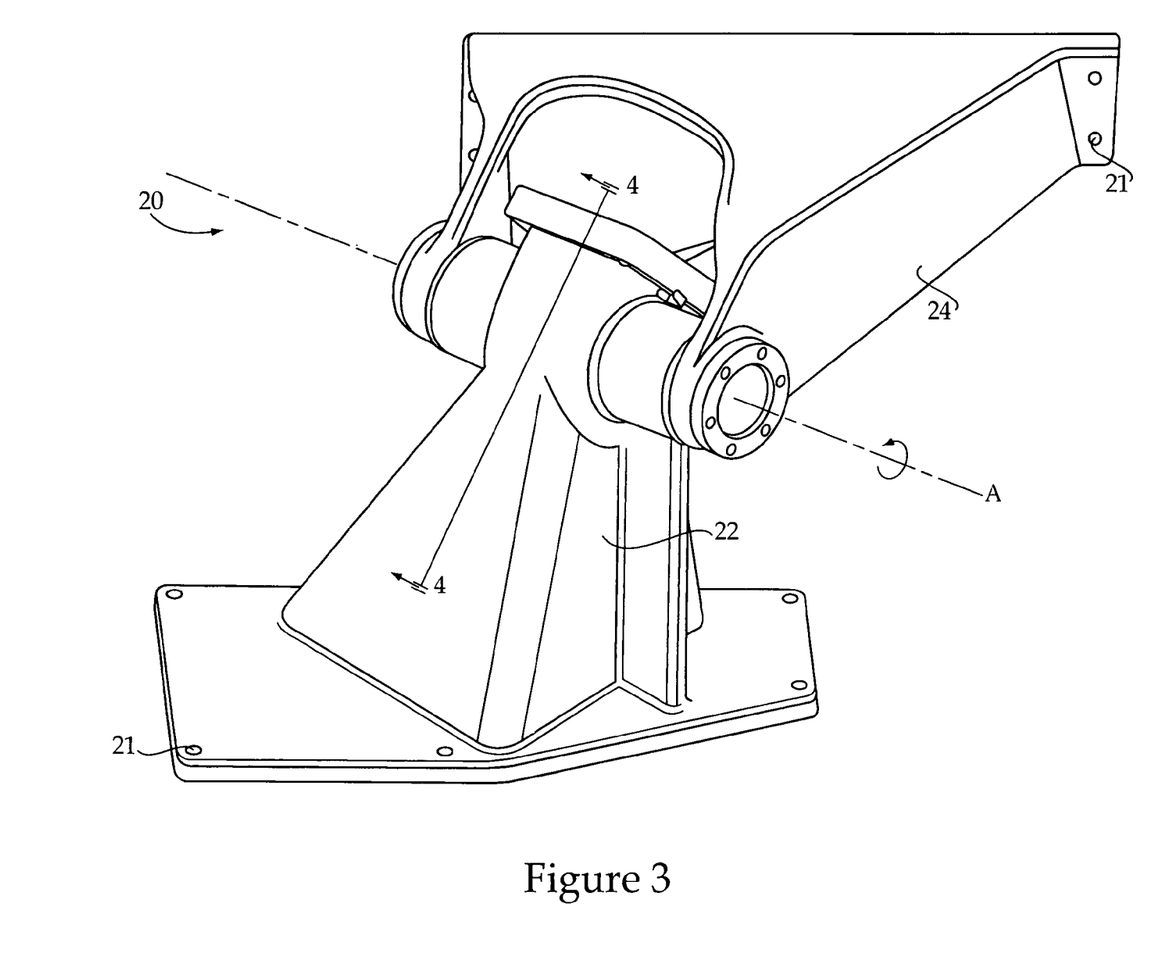
FIG. 3 is a perspective view of a powered hinge mechanism according to an aspect of the present disclosure.

Turning now to FIG. 3, there is shown hinge mechanism 20, preferably a modular unit including an actuator (not visible in FIG. 3) operable to pivot a first hinge portion 22 relative to a second hinge portion 24. The respective hinge portions are pivoted about hinge axis A, preferably by torquing the same, one against the other. In a preferred embodiment, one of hinge portions 22 and 24 is coupled to ladder 16, and the other of hinge portions 22 and 24 is coupled to work machine 10, for example by connecting the same to work machine body 11 or to operator platform 14, included thereon. Each of hinge portions 22 and 24 may be configured to mount to ladder 16 or to body 11, as desired, for example by providing a plurality of fastener holes 21 therein. It is contemplated that hinge mechanism 20 and ladder 16 could be coupled together and provided as a single, modular unit for retrofitting with existing work machines. This flexibility might permit identical hinge mechanisms 20 to be suitable for use on either side of a variety of work machines.

Figure 4:
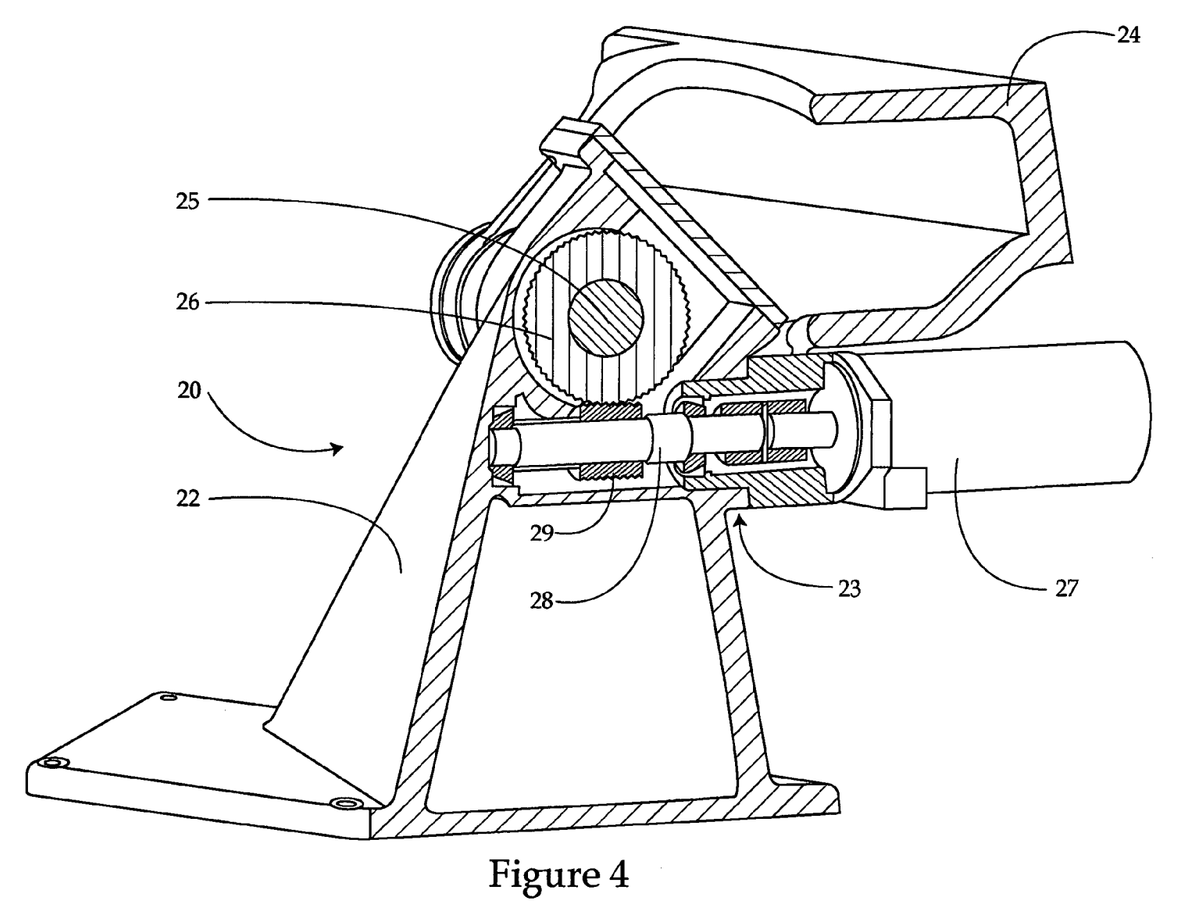
FIG. 4 is a partially sectioned diagrammatic view of the powered hinge mechanism of FIG. 3 taken along line 4-4 thereof.

Referring now to FIG. 4, illustrating a partial view of hinge mechanism 20, taken along line 4-4 of FIG. 3, there is pictured an actuator system 23 including a motor 27 and armature 28. In a preferred embodiment, actuator system 23 includes a rotary actuator such as a conventional hydraulic, rotary actuator, or hydraulic motor. Actuator system 23 is preferably coupled to one of hinge portions 22 and 24, and is operable to pivot a pin 25 that couples hinge portions 22 and 24 together. Pin 25 is in turn preferably fixed to one of hinge portions 22 and 24, and thus rotation thereof will torque portions 22 and 24 one against the other. Armature 28 is preferably equipped with a toothed collar 29 engageable with a complementary toothed collar 26 on pin 25. Thus, rotation of armature 28 will induce rotation of pin 25 via an interaction between collars 26 and 29.

A wide variety of possible alternative designs are contemplated for actuator system 23. For example, rather than being operable to rotate a pin, actuator system 23 might include an actuator that directly displaces hinge portions 22 and 24 relative to one another. Such "direct" actuation might include a design wherein a conventional linear actuator is connected to the outside of one of hinge portions 22 and 24, and a piston is connected to the other of hinge portions 22 and 24. Further, rather than the described actuator, another suitable rotational actuator might be coupled to pin 25, and be operable to rotate the same. Such a rotational actuator might rotate pin 25 via a direct coupling therewith. Similarly, any suitable hydraulic, pneumatic or electrical linear actuator might be coupled to hinge portions 22 and 24, or to one of the same and to pin 25. In the latter case, a cylinder and piston might be employed to drive a rotation of pin 25 via a geared engagement therewith. The disclosure also contemplates manual actuation via a crank in a known manner.

Figure 5:
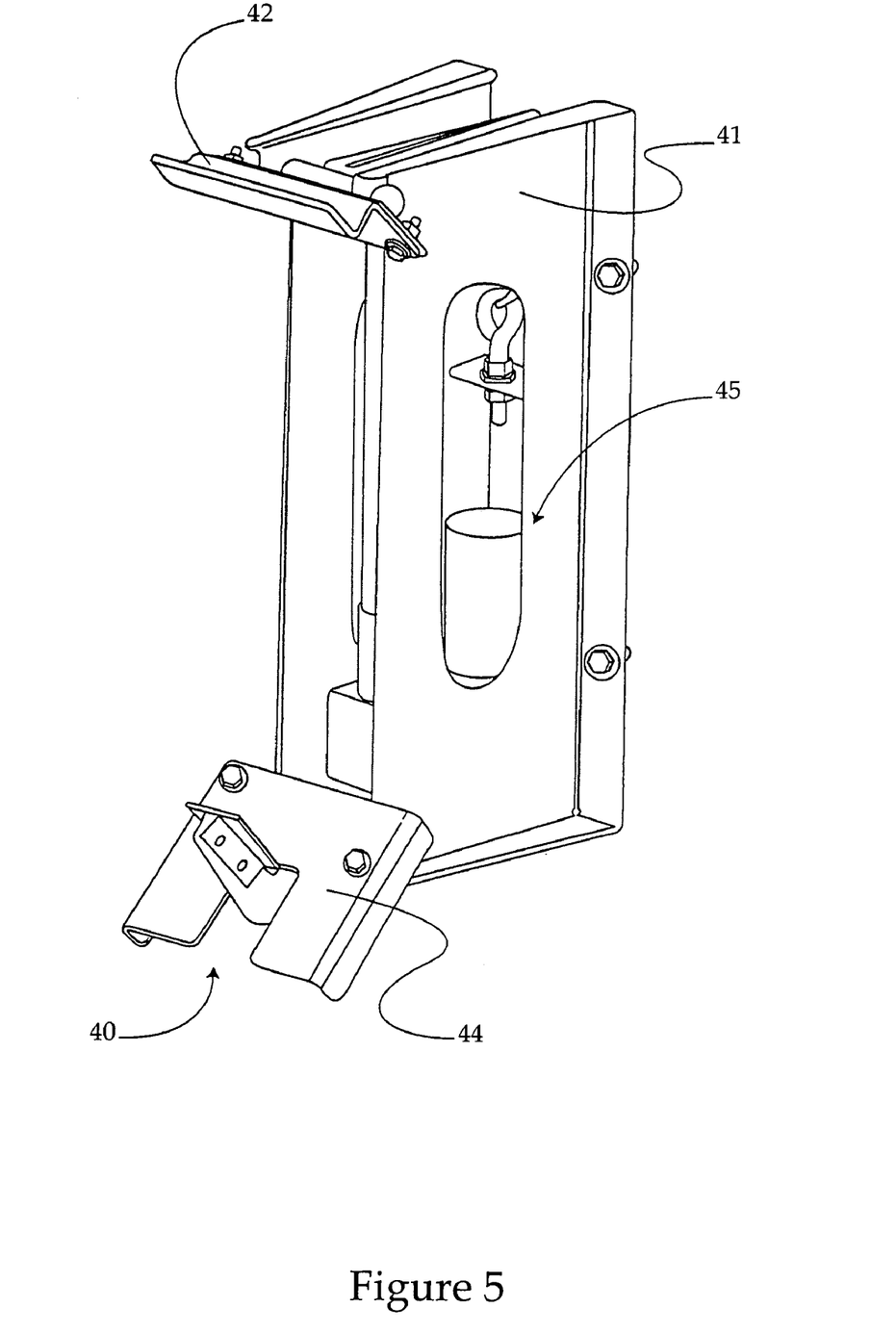
FIG. 5 is a side perspective diagrammatic view of an access ladder latch mechanism according to another aspect of the present disclosure.
Figure 6:
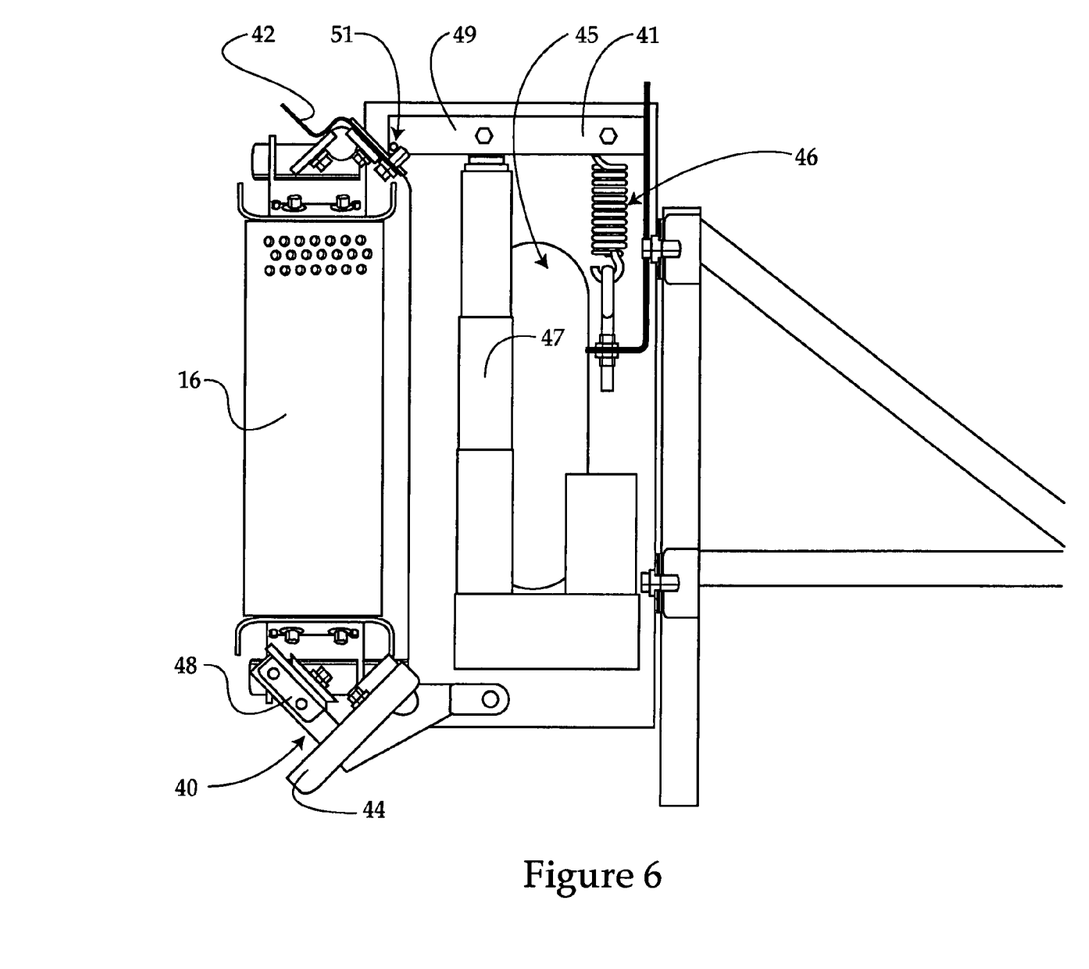
FIG. 6 is a side perspective diagrammatic view of the access ladder latch mechanism of FIG. 5.

Bulldozers and other work machines such as work machine 10 often operate over steep grades and rough surfaces. When ladder 16 is pivoted to its stowed position, it may thus be desirable to secure an end of the ladder remote from hinge mechanism 20. Referring to FIGS. 2, 5 and 6, there is shown a latch mechanism or cradle 40 for securing ladder 16 in its stowed position. Cradle 40 includes a cradle body 41, and first and second cradle plates 42 and 44 coupled thereto. Cradle plates 42 and 44 are preferably configured to receive ladder 16 over a relatively broad range of geometric tolerances. For example, cradle plates 42 and 44 are preferably disposed on body 41 such that ladder 16 may fit there between at a range of vertical positions.

An actuator system 45 is preferably provided, and is operable to move a finger latch 48 extending through one of plates 42 and 44, for example plate 44, between an "open" position, and a "closed" position. In a preferred embodiment, actuator system 45 includes an actuator 47, and a spring 46. Actuator 47 may be any suitable actuator, and is preferably a linear hydraulic, pneumatic or electrical actuator. Actuator 47 is most preferably a linear electrical actuator having a fixed stroke distance.

Referring in particular to FIG. 6, there is shown a side view of cradle 40 securing ladder 16 therein. Actuator 47 is preferably coupled to an arm 49 having a pivot point 51 on cradle body 41. A spring 46 is preferably connected with arm 49 opposite pivot point 51. Extension and retraction of actuator 47 preferably moves finger latch 48 between an open and a closed position, as shown in FIG. 6. In the closed position of finger latch 48, it engages about ladder 16 to restrain the same in cradle 40. Extension of actuator 47 pivots arm 49 about pivot point 51, preferably extending spring 46 once finger latch 48 is moved to its closed or latching position about ladder 16. In many earlier designs, electrical actuators were equipped with a plurality of internal clutches that would begin to slip once the actuator reached a limit of its extension. In such designs, the actuator would reach the limit of its stroke distance and the clutches would continually slip until the actuator was shut off, potentially wearing out the internal clutches over time. In cradle 40 of FIG. 6, arm 49 coupled with spring 46 allows a more gradual slowing of actuator 47 as it approaches the limit of its stroke distance, rather than stopping actuator 47 and immediately relying on slipping clutches. In other words, spring 40 preferably opposes extension of actuator 47 beyond a selected distance without suddenly halting extension of the same. After successfully latching finger latch 48 about ladder 16 to capture the same, actuator 47 may be manually or automatically turned off.

INDUSTRIAL APPLICABILITY

Referring to the drawing Figures generally, it is contemplated that ladder 16 will be stored in its deployed position when work machine 10 is not in use. In certain circumstances, for example for security reasons, it may be desirable to stow ladder 16 between operations. For such situations, work machine 10 may be equipped with a key or electronic code system, which may be wireless, accessible to a person standing on the ground, and operable to deploy ladder 16 from cradle 40, and actuate hinge mechanism 20.

From the ground, an operator may therefore climb ladder 16, and subsequently move the same to its stowed position. From the ladder system controls, the operator will initially activate actuator assembly 23 to begin pivoting of ladder 16 about axis A, and initiating its travel away from the deployed position. In a preferred embodiment activating of actuator system 23 takes place by initiating hydraulic fluid flow between motor 27 and the work machine hydraulic system (not shown). Motor 27 in turn begins to rotate pin 25 and the coupled hinge portion relative to the other hinge portion.

In a preferred embodiment, hinge mechanism 20 includes a conventional rotational hydraulic actuator system 23. Because hinge mechanism 20 is preferably modular, a stationary attachment point on the work machine for actuator system 23 is unnecessary. Control of actuator system 23, and therefore deployment or stowing of ladder 16, is possible via an electronic control system in work machine 10, or with an operator-controlled onboard switch. To minimize the risk of equipment damage, it is preferable to utilize an operator-controlled electromechanical switch, preferably positioned outside of cab 12 such that the operator can only deploy or stow ladder assembly 18 when the same is visible to him or her. By positioning the switch outside of the cab, and in view of the travel path of ladder 16, the operator can visually confirm that there are no obstructions ladder 16 is likely to encounter travelling between its deployed and stowed positions.

With any suitable actuation system, hinge portions 22 and 24 are preferably torqued one against the other to swing ladder 16 about hinge axis A. As ladder 16 swings upwardly, it will also preferably flip front to back such that outer side 19a will become oriented toward work machine body 11, and finally preferably face the same upon reaching cradle 40. Upon reaching the stowed position, hydraulic fluid flow between motor 27 and the work machine hydraulic system is halted, either manually or automatically, for example, by sensing a position of the ladder 16.

When ladder 16 reaches cradle 40, actuator system 45 will preferably be activated, either automatically or by the operator, to capture ladder 16. Following operation of work machine 10, when the operator wishes to climb down, the process takes place essentially in the reverse of that described above. Actuator system 45 is activated to move finger latch 48 toward its open position, and actuator system 23 preferably controls ladder 16 as it returns toward its deployed position, allowing the operator to climb down.

The present disclosure thus provides a preferably powered system having relatively few parts, and operating with a simple, single path motion for movement of ladder 16 between its deployed and stowed positions. The single hinge axis allows a single actuator to be used, and requires only one hydraulic connection once the hinge mechanism 20 and associated ladder 16 are mounted to work machine 10.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the present disclosure. As described, various alternative actuation systems might be used with hinge mechanism 20. Any of spur, bevel or worm gearing types might be used. Further, rather than controlling movement of ladder 16 toward is deployed position with actuator system 23, a spring or similar mechanism might be used. Other aspects, features and advantages will be apparent upon an examination of the attached Figures and appended claims.

What is claimed is:

1. A machine access ladder assembly comprising:
    a ladder having first and second side rails that terminate at a top end of the ladder, and a plurality of steps connected between the first and second side rails below the top end;
    a hinge mechanism having a first hinge portion mounted to said first side rail closer to a top step than the top end of the ladder, and a second hinge portion pivotably coupled to said first hinge portion via a pin, said pin being fixed to one of the first hinge portion and the second hinge portion, said second hinge portion including mounting features for mounting the same to a machine;
    said pin of said hinge mechanism being spaced a distance away from said first side rail in a direction perpendicular to the first and second side rails, and said pin defining a hinge axis oriented diagonally with respect to said rails such that the ladder flips front to back and vertical to horizontal when rotated by the hinge mechanism from a deployed position to a stowed position; and
    an actuator disposed to engage a toothed collar of said pin, wherein the actuator is operable to rotate the pin and the one of the first hinge portion and the second hinge portion relative to the other of the first hinge portion and the second hinge portion; wherein said actuator is operable to torque said first and second hinge portions one against the other.

2. The ladder assembly of claim 1 wherein said actuator is a rotational actuator, said actuator including at least one of a hydraulically, pneumatically or electrically powered actuator.

3. The ladder assembly of claim 1 wherein said actuator is a linear actuator.

4. The ladder assembly of claim 1 wherein said toothed collar is disposed proximate a center of said pin and rotatable within a space defined by at least one of said first and second hinge portions.

5. A machine access ladder assembly comprising:
    a ladder having first and second side rails and a plurality of steps connected between the first and second side rails to define a front face, a back face, a first side face and a second side face;

a hinge mechanism having a first hinge portion mounted to one of said first side face and said second side face, and a second hinge portion pivotably coupled to said first hinge portion via a pin, said pin being fixed to one of the first hinge portion and the second hinge portion, said second hinge portion including mounting features for mounting the same to a machine;

said pin of said hinge mechanism being spaced a distance away from said first side rail in a direction perpendicular to the first and second side rails, and said pin defining a hinge axis oriented diagonally with respect to said rails such that the ladder flips front to back and vertical to horizontal when rotated by the hinge mechanism from a deployed position to a stowed position; and a cradle configured to engage the first and second side rails to restrain the ladder in the cradle when the ladder is in the stowed position; wherein said hinge mechanism comprises an actuator operable to torque said first and second hinge portions one against the other.

6. The ladder assembly of claim 5 wherein said actuator is a rotational actuator, said actuator including at least one of a hydraulically, pneumatically or electrically powered actuator.

7. The ladder assembly of claim 5 wherein said pin includes a geared collar disposed proximate a center thereof and rotatable within a space defined by at least one of said first and second hinge portions.

8. The ladder assembly of claim 5 wherein the hinge axis is positioned and oriented such that the ladder rotates through a 90 degree angle from the deployed position to the stowed position.

9. A machine access ladder assembly comprising:

a ladder having first and second side rails and a plurality of steps connected between the same;

a hinge mechanism having a first hinge portion attached to cover a portion of said first side rail, and a second hinge portion pivotably coupled to said first hinge portion by a pin, said second hinge portion including mounting features for mounting the same to a machine;

said pin of said hinge mechanism being spaced a distance away from said first side rail in a direction perpendicular to the first and second side rails, and said pin defining a hinge axis oriented at a diagonal with respect to said rails such that the ladder flips front to back and vertical to horizontal when rotated by the hinge mechanism from a deployed position to a stowed position; and a cradle configured to engage the first and second side rails to restrain the ladder in the cradle when the ladder is in the stowed position, wherein the cradle is disposed to secure an end of the ladder remote from hinge mechanism; wherein said hinge mechanism comprises an actuator operable to torque said first and second hinge portions one against the other.

10. The ladder assembly of claim 9 wherein said actuator is a rotational actuator, said actuator including at least one of a hydraulically, pneumatically or electrically powered actuator.

11. The ladder assembly of claim 9 wherein said actuator is a linear actuator.

12. The ladder assembly of claim 11 wherein:

said actuator is mounted to one of said first and second hinge portions and includes a plurality of gear teeth disposed thereon;

the other of said hinge portions includes a geared member connected therewith and engageable against said actuator; and said actuator being operable to rotate said geared member to pivot the connected hinge portion relative to the other of said hinge portions.

13. The ladder assembly of claim 12 wherein said geared member comprises a pin coupling said first and second hinge portions together, said pin including a geared collar disposed proximate a center thereof and rotatable within a space defined by at least one of said first and second hinge portions.

14. The ladder assembly of claim 9 wherein the hinge axis is positioned and oriented such that the ladder rotates through a 90 degree angle from the deployed position to the stowed position.

15. The ladder assembly of claim 1 further comprising a cradle disposed to secure an end of the ladder remote from hinge mechanism and configured to engage the first and second side rails to restrain the ladder in the cradle when the ladder is in the stowed position.

16. The ladder assembly of claim 15 wherein the cradle includes a cradle actuator configured to move the cradle between an open position and a closed position.

17. The ladder assembly of claim 16 wherein the actuator is a hinge actuator; and further comprising an electronic control system configured to control the hinge actuator and the cradle actuator, wherein when the ladder reaches the cradle, the electronic control system halts the actuator and activates the cradle actuator to secure the ladder in the stowed position.

18. The machine access ladder assembly of claim 5 wherein said cradle includes a latch movable between an open position and a closed position by a cradle actuator.

19. The machine access ladder assembly of claim 9 wherein said cradle includes a latch movable between an open position and a closed position by a cradle actuator.

* * * * *